United States Patent
Chen

(10) Patent No.: US 7,555,588 B2
(45) Date of Patent: Jun. 30, 2009

(54) COMPUTERS HAVING USB BUSES, METHODS OF OPERATION THEREOF AND PROGRAMS AND INFORMATION FOR USE THEREWITH

(75) Inventor: Johnny Hsiang-yu Chen, Anaheim, CA (US)

(73) Assignee: I/O Interconnect Inc, Santa Ana, CA (US)

( * ) Notice: Subject to any disclaimer, the term of this patent is extended or adjusted under 35 U.S.C. 154(b) by 140 days.

(21) Appl. No.: 11/840,291

(22) Filed: Aug. 17, 2007

(65) Prior Publication Data

US 2009/0049213 A1 Feb. 19, 2009

(51) Int. Cl.
*H05K 7/10* (2006.01)
(52) U.S. Cl. ...................... 710/301; 709/232
(58) Field of Classification Search ......... 710/301–302, 710/2, 5; 709/232
See application file for complete search history.

(56) References Cited

U.S. PATENT DOCUMENTS 7,327,486 B2 * 2/2008 Renda ...................... 358/1.16
2004/0243749 A1 12/2004 Learmonth
2006/0173803 A1 * 8/2006 Morris ........................... 707/1
2008/0082699 A1 * 4/2008 Alrod et al. ..................... 710/2
2009/0024757 A1 * 1/2009 Proctor ....................... 709/232
2009/0024764 A1 * 1/2009 Atherton et al. ............. 709/250

OTHER PUBLICATIONS

Regain Location Information by Leveraging the 1-Wire Chain Function, Maxim Engineering Journal, vol. 60, May 2007, pp. 16-19, http://pdfserv.maxim-ic.com/en/ej/EJ60.pdf.

* cited by examiner

*Primary Examiner*—Clifford H Knoll
(74) *Attorney, Agent, or Firm*—John V. Stewart

(57) ABSTRACT

A computer has a USB bus with at least two USB connectors for removable USB devices. When a removable USB device is connected to at least one of the connectors, conventional standard actions are auto-launched. However, when a removable USB device is connected to at least one special USB connector, no action is auto-launched, or some non-standard action is auto-launched. The special USB connector is designated as such by a configuration file stored by the computer, because neither the USB address and port number of the hub for the special connector, nor the USB address allocated to the removable USB device can simply be used for this purpose.

11 Claims, 4 Drawing Sheets

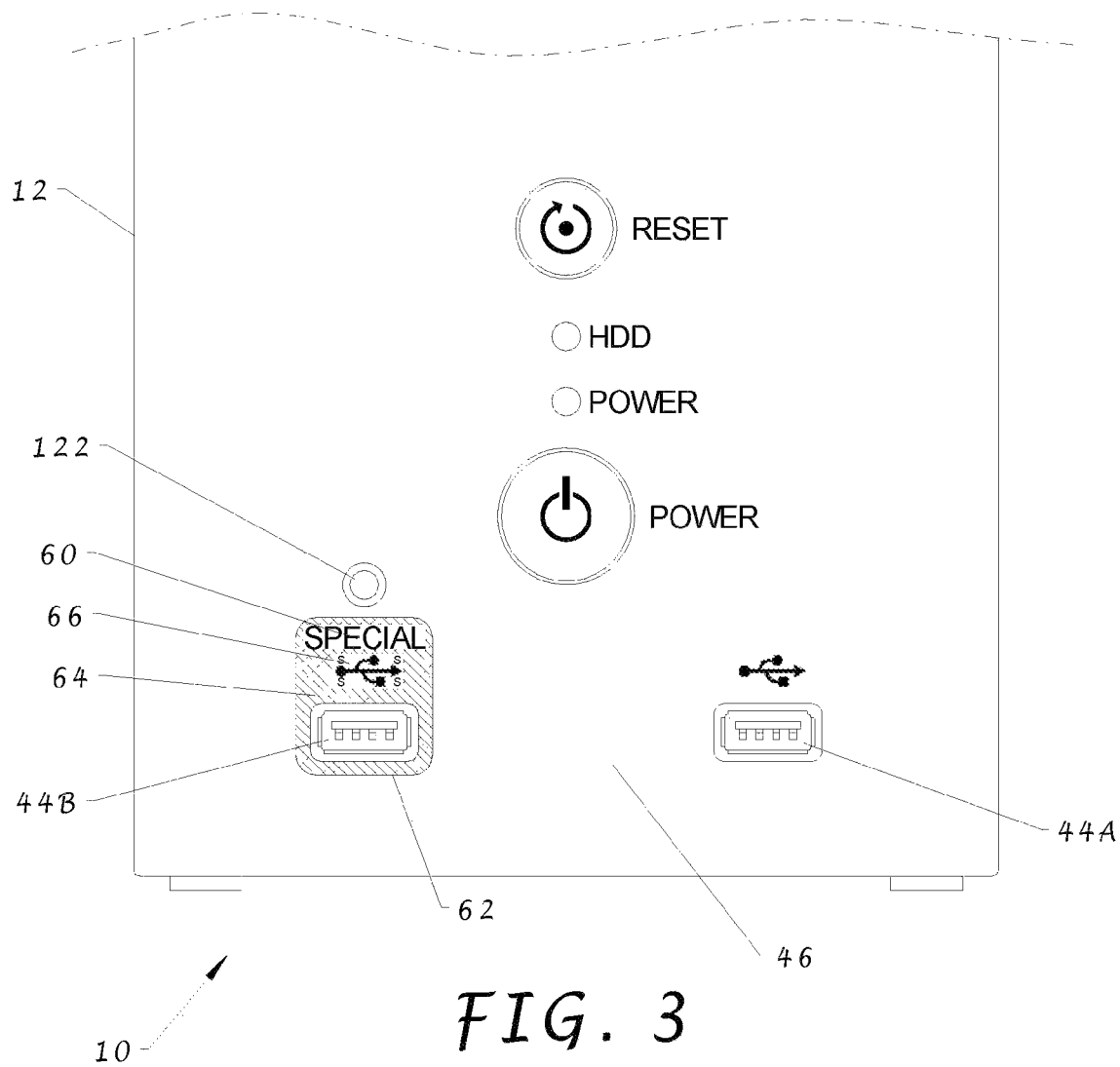
FIG. 3
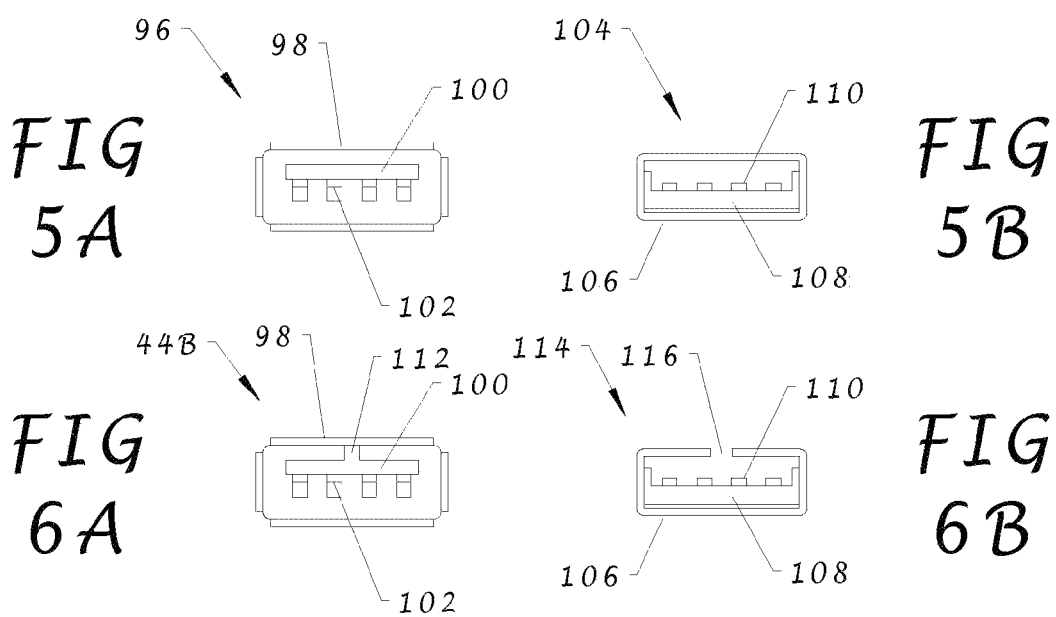

COMPUTERS HAVING USB BUSES, METHODS OF OPERATION THEREOF AND PROGRAMS AND INFORMATION FOR USE THEREWITH

BACKGROUND OF THE INVENTION

1. Field of the Invention

This invention relates to computers that employ Universal Serial Buses (hereinafter referred to as "USB buses" despite the tautology), to methods of operation of such computers and to programs and information for use by such computers.

In particular, a first aspect of the invention relates to computer having a USB bus including at least two connectors to each of which removable USB devices can be connected, the computer being programmed such that, after start-up of the computer and upon connection of a removable USB device to such a connector: (i) a unique USB address is allocated to that removable USB device, the allocated USB address being used by the computer to address data packets on the USB bus to that removable USB device, and the USB address not necessarily being the same each time that removable USB device is connected to the computer; and (ii) at least for some removable USB devices, a software program relevant to that USB device is automatically launched;

BACKGROUND OF THE INVENTION

2. Description of the Related Art

Such computers are well known. In a typical Personal Computer ("PC") using a Windows® operating system, when a removable USB device, such as a digital camera, is plugged into a USB socket on a front panel of the computer, the operating system may cause a window to pop-up on the user's screen asking the user to select between, for example, (i) running a photo-editing program, (ii) running a scanner and camera wizard; (iii) opening the folder in the camera's memory containing the picture files; or (iv) doing nothing. Alternatively, a USB device such as a U3 drive may itself hold software that is automatically launched when the device is connected to the computer. Although such functionality may be useful in some circumstances, automatic actions can also become irritating and an annoyance for users, where unnecessary software applications are launched and hinder the user in their work. Also, pop-up windows can obscure and clutter the PC screen workspace.

BRIEF SUMMARY OF THE INVENTION

An aim of the present invention, or at least of specific embodiments of it is to provide, in a simple manner, the user with the option as to whether or not such automatic actions occur, or whether some different, non-standard action should occur automatically, when a removable USB device is connected to a computer.

The computer of the first aspect of the invention is characterised in that it is programmed to respond differently when a removable USB device is connected to at least one particular one of the USB connectors in that: (a) the computer is programmed to detect whether that removable USB device has been connected to said one particular USB connector; and (b) in response to such detection, the computer is programmed to do one of the following: (i) not to launch or to cancel launching of a software program that would have been launched if that removable USB device had been connected said other USB connector; (ii) to launch a software program that would not have been launched if that removable USB device had been connected said other USB connector; and (iii) to launch a software program that is different to a software program that would have been launched if that removable USB device had been connected said other USB connector.

Accordingly, the user can choose whether to connect a removable USB device to the particular "special" USB connector or to another conventional USB connector and the computer will respond differently in dependence on the user's choice.

A problem arises, in the type of computer to which this invention relates, that USB software applications do not access USB ports or USB connectors by addressing the port or connector. When a removable USB device is connected to the computer, it is allocated a USB address, and this address can change if the device is removed and subsequently reconnected, even to the same USB connector and port, or if the system is re-started. USB software applications access USB devices using the USB address that happens to have been allocated to the USB device. To deal with this problem, a preferred embodiment of the invention takes advantage of the realisation that the navigation path along the USB bus to the particular special USB connector does not change, even if the USB address of the device connected to that connector may change. Accordingly, in a preferred embodiment, the computer stores path information indicative of a path to said one particular connector on the USB bus, and the computer is programmed to detect connection of a removable USB device to said one particular connector with reference to the stored path information. In the case where the USB bus includes a USB hub having a plurality of ports and said one particular connector is connected to a particular one of the ports of the USB hub, the computer is preferably programmed to detect connection of a removable USB device to said one particular connector by: (i) determining the USB address of the USB hub with reference to the stored path information; (ii) determining the identity of said particular port with reference to the stored path information; and (iii) repeatedly requesting the status of the port with the determined identity on the USB hub with the determined USB address.

In order to assist in preventing a software function being auto-launched with a device connected to the particular special USB connector which is not suited to that function, said one particular USB connector (typically a socket) may differ in structure from said other USB connector, the latter typically being a standard structure of USB socket. In other words, the special USB connector of the computer may be a non-standard USB socket. Accordingly, a standard structure of USB plug cannot be connected to the particular special USB connector. In this case, a USB connector adapter may be provided having a first portion, similar in structure to said other USB connector, connected to a second portion arranged to connect with said one particular USB connector. In other words, the adaptor may have a standard USB socket (into which the USB device's standard plug can be inserted) connected to a non-standard USB plug (which can be plugged into the special, non-standard USB socket of the computer). The adapter may be arranged to be permanently connected to the removable USB device.

The computer may also include a manually operable element (such as a push-button) associated with said one particular USB connector, in which case the computer may be programmed to respond differently when a removable USB device is connected to said one particular USB connector in dependence upon operation of the manually operable element. For example, the particular special USB connector may be arranged to act as a standard connector if the button is not pressed within three seconds after the USB device is connected, but to provide a non-standard function if the button is pressed within three seconds after the USB device is connected.

A second aspect of the invention provides a corresponding method of operation of a computer, and a third aspect of the invention provides the combination of configuration information and a utility program file for a computer.

BRIEF DESCRIPTION OF THE SEVERAL VIEWS OF THE DRAWINGS

FIG. 3 is a front view of a lower portion of a front panel of the computer of FIG. 2;

FIGS. 5A-5B are end views of a conventional USB socket and plug, respectively;

FIGS. 6A-6B are end views of a modified USB socket and plug, respectively, that may be employed in the embodiment of the invention.

DETAILED DESCRIPTION OF PREFERRED EMBODIMENTS OF THE INVENTION

Figure 1:
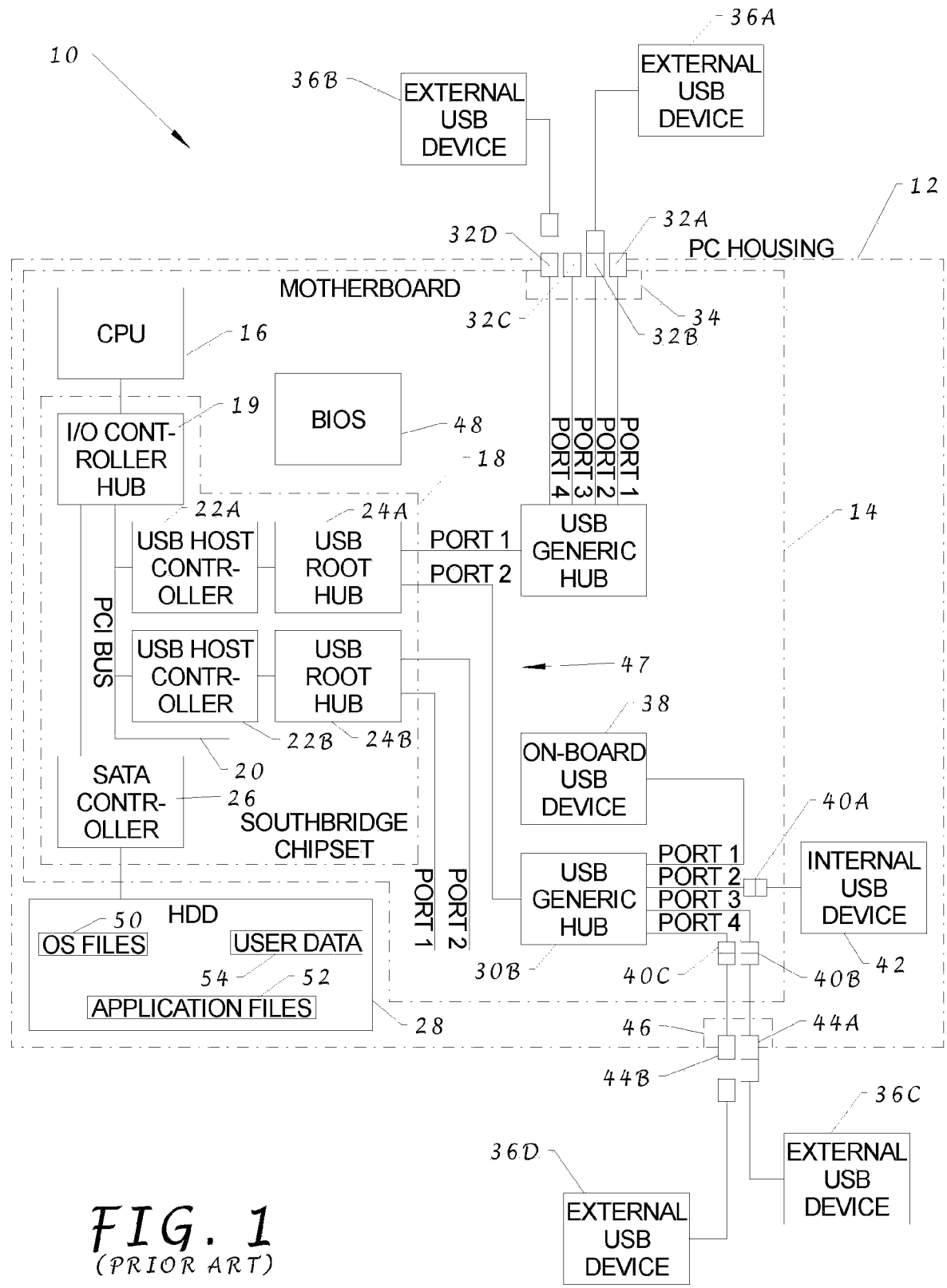
FIG. 1 is a schematic diagram of the parts of a personal computer relevant to an understanding of the embodiment invention, but without embodying the invention.

Referring to FIG. 1, as is well known, a PC 10 may comprise a housing 12 containing a motherboard 14. The motherboard 14 carries a central processing unit ("CPU") 16 and a Southbridge chipset 18. The Southbridge chipset 18 includes an input/output ("I/O") controller hub 19 communicating with the CPU 16. The I/O controller hub 19 communicates via a Peripheral Component Interconnect ("PCI") bus 20 with a number of USB host controllers, for example two USB host controllers 22A,22B, and other components on the motherboard 14. Each USB host controller 22A,22B is connected to a respective USB root hub 24A,24B. The Southbridge chipset 18 also includes an Serial Advanced Technology Attachment ("SATA") controller 26 connected to a SATA hard disk drive ("HDD") 28 off the motherboard 14. Each USB root hub 24A,24B has a number of USB ports, for example two USB ports, designated Port 1 and Port 2, each of which is connected to a respective USB generic hub 30A,30B. Each USB generic hub 30A,30B has a number of ports, for example four ports, designated Port 1 to Port 4, which may be connected:—

(i) to respective USB sockets 32A-32D mounted on the motherboard 14 and accessible at a rear panel 34 of the PC housing 10, so that any external USB devices, such as devices 36A,36B, may be removably connected to the rear USB sockets 32A-32D, as in the case of Port 1 to Port 4 of USB generic hub 30A;

(ii) directly to a USB device 38 mounted on the motherboard 14, as in the case of Port 1 of USB generic hub 30B;

(iii) to a USB header 40A on the motherboard 14, which is in turn connected to an internal USB device 42 mounted in the PC housing 12, as in the case of Port 2 of USB generic hub 30B; and (iv) to USB headers 40B,40C on the motherboard 14, which in turn are connected to respective USB sockets 44A,44B mounted on a front panel 46 of the PC housing 10, so that any external USB devices, such as devices 36C,36D, may be removably connected to the front USB sockets 44A, 44B, as in the case of Port 3 and Port 4 of USB generic hub 30B.

The USB host controllers 22A,22B, their ports to the root hubs 24A,24B, the root hubs 24A,24B and their ports, and the generic hubs 30A,30B and their ports, together form a USB bus 47.

The motherboard 14 also carries a memory chip containing a Basic Input/Output System ("BIOS") 48, which is code run upon start-up of the PC 10 to enable the CPU 16 to access operating system files 50 (for example for the Windows® operating system) stored on the HDD 28 so that the PC 10 can load the operating system. Once the operating system has been loaded, the PC 10 can execute application files 52 stored on the HDD 28 and can access user data 54 on the HDD 28.

Unlike serial and parallel ports traditionally found in PCs, which have fixed and known addresses, the USB ports of the USB root hubs 24A,24B and the USB generic hubs 30A,30B are not addressable. USB software applications do not access USB ports by address; they can only access a USB device (such as the USB host controllers 22A,22B, root hubs 24A, 24B, generic hubs 30A,30B, external USB devices 36A-36D, on-board USB device 38 or internal USB device 42) by address, an address which is allocated at system start-up, or when the USB device is connected to the PC 10. The USB address of a USB device can change when the device is disconnected and subsequently reconnected to the PC 10, or when the PC 10 is re-started.

Each USB device 24A,24B, 30A,30B, 36A-36D, 38, 42 has a default USB address of "0". During system start-up, or when a USB device is connected to the PC 10, the USB address of each connected USB device is changed from its default address of "0" to an allocated unique USB address in the range "1" to "127" in a process called enumeration. In that process, the operating system requests information from the USB device and assigns a free USB address and a class driver or device driver that software applications can use to communicate with the USB device. Low-level drivers provided by the operating system communicate with the USB device on the USB bus 47. When a packet of data is to be sent to a particular USB device, the USB bus 47 embeds the allocated USB address of the particular USB device in the packet of data, and the packet of data is sent on the USB bus 47 to all connected USB devices, but is discarded by all of the USB devices except the device having the same address as the address embedded in the packet of data. Once a USB address has been allocated to a USB device, it remains unaltered until either the PC 10 is closed down or the USB device is disconnected from the PC 10. Therefore, once the non-removable USB devices (i.e. the host controllers 22A,22B, the hubs 24A,24B,30A,30B, the on-board USB device 38 and the internal USB device 42) have each been allocated a USB address upon start-up of the PC 10, those addresses remain unaltered until the PC 10 is closed down.

When a removable USB device, such as external USB device 36D, is newly connected to the PC 10 after start-up of the PC 10, in addition to the allocation of a USB address and driver to that device 36D during the enumeration process, software functions relevant to the particular device 36D can be automatically launched in many ways. The operating system, or other installed running program, can suggest software applications depending on the device type or, for storage devices, the file types detected in the device 36D, or the connected device 36D may itself hold the software and auto-launch, as in the case of U3 drives. In the case where the device 36D is a digital camera, for example, the operating system may cause a window to pop-up on the user's screen asking the user to select between (i) running a photo-editing program, (ii) running a scanner and camera wizard; (iii) opening the folder in the camera's memory containing the picture files; or (iv) doing nothing.

The arrangement described above with reference to FIG. 1 is prior art well-known to the person skilled in the art.

Automatic actions upon connection of a removable USB device can become irritating and an annoyance to users, where unnecessary software applications are launched and hinder the user in their work. Unnecessary pop-up windows can obscure and clutter the screen attached to the PC. To deal with this, a modification to the known arrangement of FIG. 1, embodying the invention, will now be described with reference to FIGS. 2 and 3.

Figure 2:
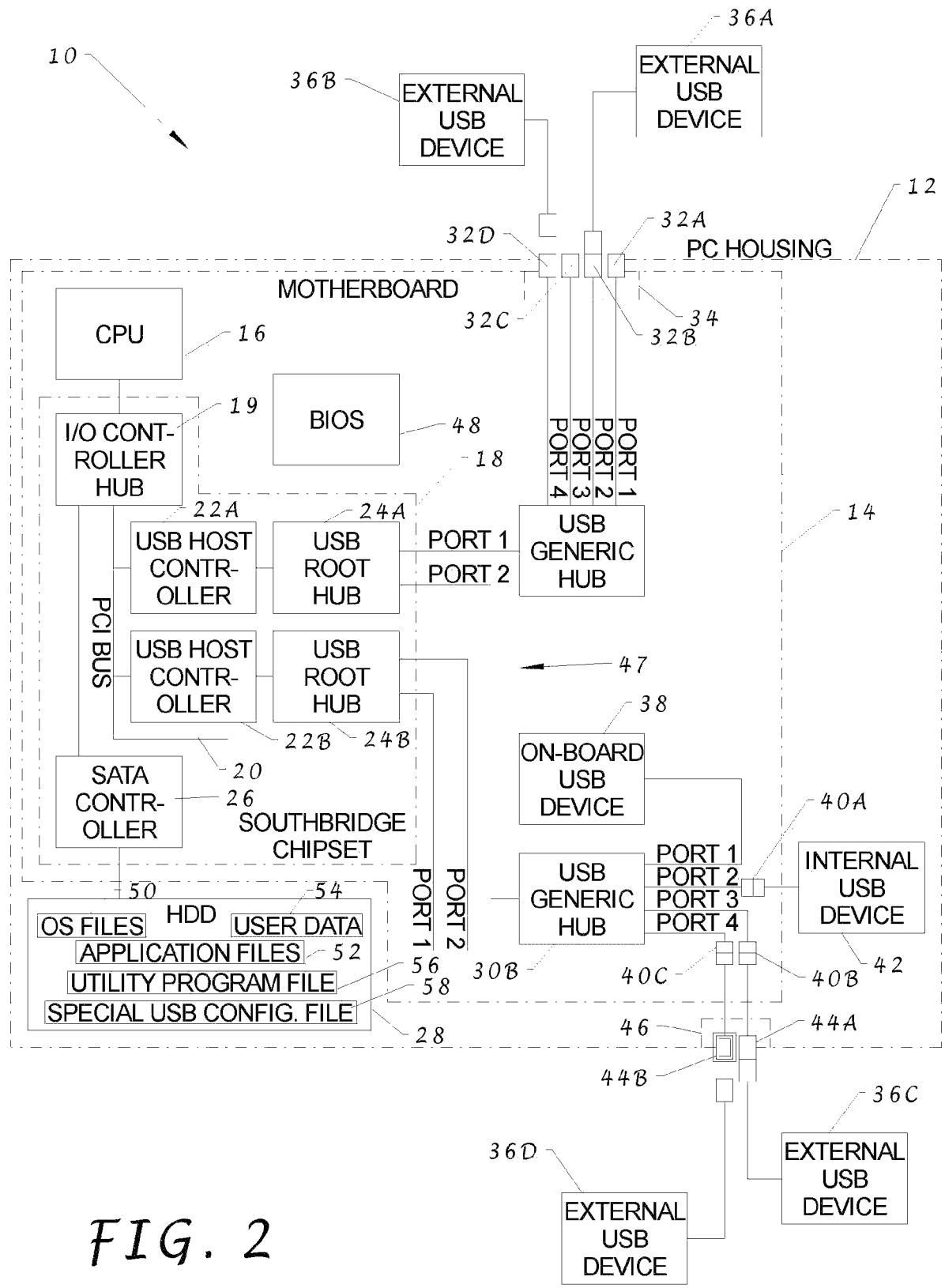
FIG. 2 is similar to FIG. 1, but showing a personal computer embodying the invention.

The PC 10 of FIGS. 2 and 3 is identical to the PC 10 described above with reference to FIG. 1, except that: (i) one of the USB sockets on the front panel 46 of the PC 10 is denoted as special; (ii) a utility program file 58 is stored on the HDD 28; (iii) the PC 10 is programmed to run the utility program in the file 58 upon start-up of the PC 10; and (iv) a special USB configuration file 58 is also stored on the HDD 28.

Specifically, and referring in particular to FIG. 3, the USB socket 44B on Port 4 of USB generic hub 30B is denoted as special by being marked on the front panel 46 with a textual label 60 and/or by being surrounded by a prominent border 62 and/or by having a prominent background 64 and/or by being marked with a special icon 66 and/or in any other suitable manner.

The configuration file 58 is specific to the design of computer and contains navigation information regarding the position of the special USB socket 44B in the USB tree structure. In the example shown, the USB controller 22A has a particular Bus Number, Slot Number, Device Number and Function Number to define its location uniquely, and these parameters are stored in the configuration file 58. The special USB socket 44B is connected to the root hub 24A associated with the host controller 22A via Port 2 of the root hub 24A and Port 4 of the generic hub 30B, and these parameters are also contained in the configuration file 58. Accordingly, the configuration file 58 contains the following:

Bus Number  
Slot Number } of the USB host controller leading to  
Device Number   the special USB socket  
Function Number  
Port Number on the root hub leading to the special USB socket  
Port Number on the generic hub leading to the special USB socket.

It should be noted that if the special USB socket 44B were connected directly to the root hub 22B, the configuration file 58 would not include the Port Number of a generic hub, and if the special USB socket 44B were connected to the root hub 22B via a succession of more than one generic hub, the configuration file 58 would include the Port Numbers of each generic hub in turn.

Figure 4:
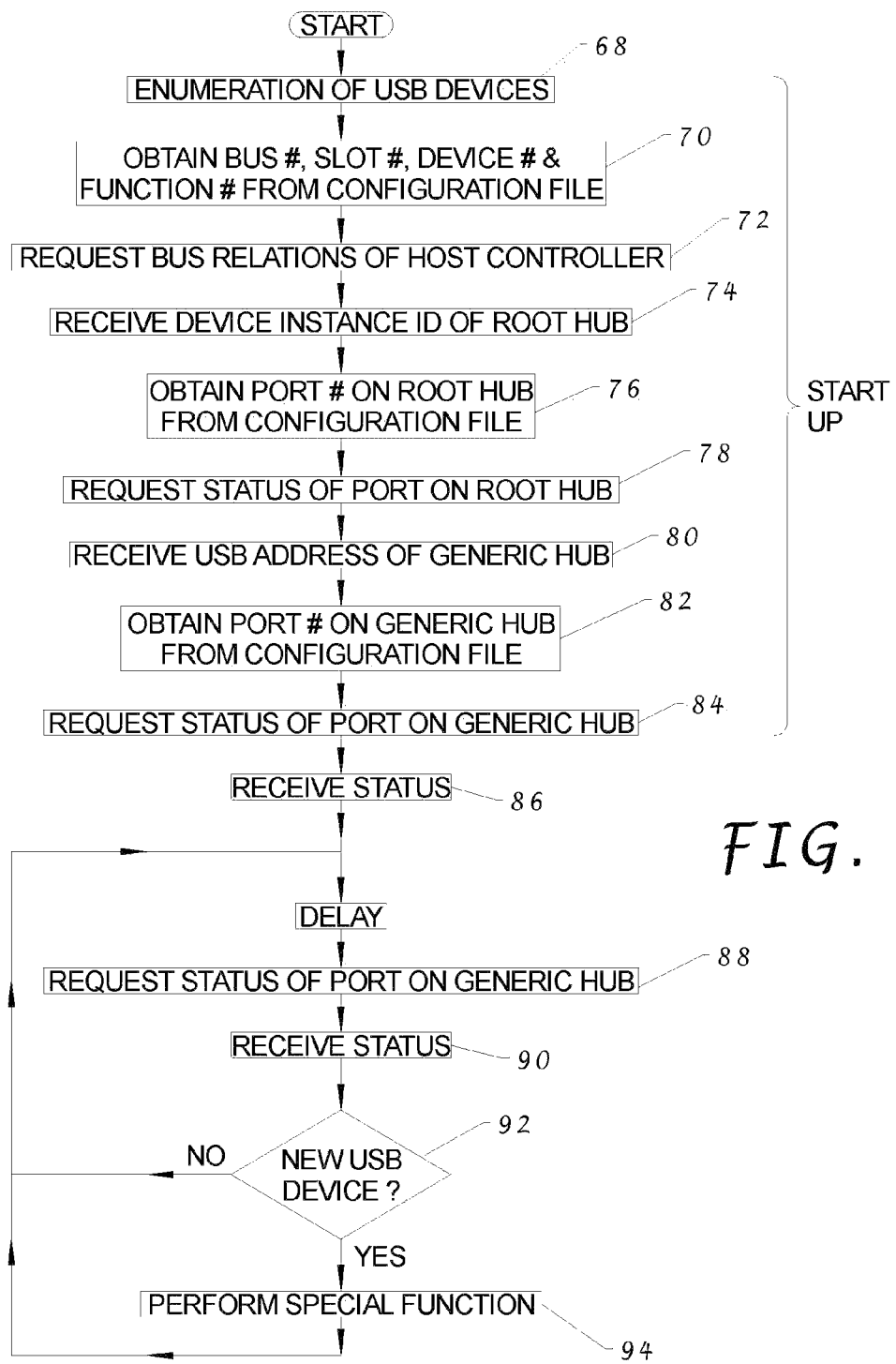
FIG. 4 is a flow diagram illustrating the processing of a software utility program run on the computer of FIG. 2.

The utility program contained in the utility file 56 is arranged to be installed and configured to run from start-up of the PC 10. Referring to FIG. 4, upon start up, and after enumeration of the connected USB devices in step 68, the utility program determines, with reference to the configuration file 58, the USB address of the hub to which the special USB socket 44B is attached, in the example, generic hub 30B. Specifically, given the Bus Number, Slot Number, Device Number and Function Number of the host controller 22A read from the configuration file in step 70, the utility program checks the Bus Relations of the host controller 22A in step 72 to obtain, in step 74, the Device Instance ID of the root hub 24A attached to the host controller 22A. Given the Device Instance ID of the root hub 24A and the Port Number on the root hub 24A leading to the special USB socket (read from the configuration file in step 76), the utility program obtains, in steps 78,80, the USB address of the generic hub 30B to which the special USB socket 44B is connected. As is known per se in USB systems, a program can obtain the status of a specified port of a USB hub by specifying the USB address of the generic hub and the Port Number of the generic hub, and the response will include the USB address and status of any USB device connected to that port. In step 82, the Port Number on the generic hub of the special socket 44B is obtained from the configuration file, and then in steps 84,86, the status is obtained.

After start-up of the PC 10, the utility program periodically (for example every ½ second) checks, in steps 88,90 the status of the special port (Port 4 in the example) of the generic hub for which the utility program has determined the USB address (generic hub 30B in the example) and determines, in step 92, whether an external USB device (device 36D in the example) has been newly connected. Once a newly connected device is detected, the utility program may be configured to take any desired action in step 94. For example, the utility program may be arranged to block the operating system or newly-connected USB device from auto-launching pop-up windows or applications which would normally be associated with the particular type of USB device. Alternatively or additionally, the utility program may be arranged to launch a particular software application program. In the latter case, before proceeding to launch the application program, the utility program may first determine whether the USB device that has been connected to the special USB socket is suited to that application program. Additionally or alternatively, the utility program may be arranged to launch one of a number of particular software application programs suited to the USB device that has been connected to the special USB socket.

As an example, in the case of a professional photographer who, when connecting his digital camera to the PC 10, normally wishes all of the picture files in the memory of the camera to be transferred to a specific folder on the HDD 28, the file transfer to be verified, and then the picture files to be deleted from the camera memory, the utility program may be arranged, when the camera is connected to the special USB socket 44B, to launch an application program which performs those actions without any further intervention by the photographer. On the other hand, if the photographer wishes to perform other operations, he may connect the digital camera to one of the other USB sockets, for example the front panel socket 44A, in which case the operating system will, as discussed above, cause a window to pop-up on the screen asking the photographer to select between (i) running a photo-editing program, (ii) running a scanner and camera wizard; (iii) opening the folder in the camera's memory containing the picture files; or (iv) doing nothing.

It will be appreciated that many modifications and developments may be made to the embodiment of the invention described above.

For example, the invention may readily be adapted by a person skilled in the art to be applicable to a computer, other than a PC running Windows®, having a shared serial bus on which devices are allocated addresses that may change from time to time.

Figure 7:
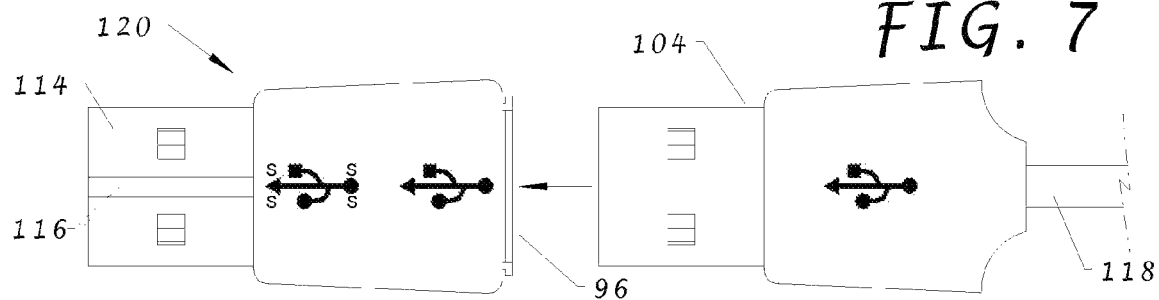
FIG. 7 is a plan view of a connector adaptor that may be used with the computer of FIG. 2.

The special USB socket 44B may be physically modified so that it cannot be connected to a standard USB plug so as to prevent software functions being applied to removable USB devices to which they are unsuited. For example, FIG. 5A shows a standard USB socket 96 having a metal housing 98 containing an insulated tongue 100 on which four electrical contacts 102 are mounted. FIG. 5B shows a complementary standard USB plug 104 having a metal housing 106 containing an insulated plate 108 on which four electrical contacts 110 are mounted. When the housing 106 of the plug 104 is inserted into the housing 98 of the socket 96, the tongue 100 overlies the plate 108 and each of the socket contacts 102 makes electrical contact with a respective one of the plug contacts 110. This standard arrangement of USB connection may be modified as shown in FIGS. 6A and 6B. In the special USB socket 44B (FIG. 5A), the insulated tongue 100 has a central upstanding key 112, and in a complementary special USB plug 114 (FIG. 5B), the metal housing 106 is formed with a corresponding slot 116 into which the key 112 can slide when the plug 114 is inserted into the socket 44B. However, the key 112 prevents a standard USB plug 104 (FIG. 4B) from being inserted into the special USB socket 44B. The USB cable of a removable USB device that is to be used exclusively with the special USB socket 44B may be fitted with the special USB plug 114. Alternatively, as shown in FIG. 7, a standard USB plug 104 on the cable 118 of the removable USB device may be permanently connected to an adaptor 120 having a standard USB socket 96 and a special USB plug 114.

A push-button switch 122 (FIG. 3) may be associated with the special USB socket 44B, and the utility program may be arranged to affect the operation of the special USB port in dependence upon whether or not the push-button switch is pressed within a predetermined time (such as three seconds) after a removable USB device has been connected to the special USB socket 44B. For example, the special features described above may be performed if the switch is pressed, and the traditional features may be performed if the switch is not pressed. In summary, this feature may be implemented by setting a spare bit in the USB status signal generated by the removable USB device in dependence upon whether or not the switch is pressed. Further detail of the implementation of this feature is to be found in patent document U.S. Pat. No. 6,941,397 B2, which is incorporated herein by reference. As a development of this, the special USB socket 44B may be provided with more than one push-button switch 44B so that different special features may be performed depending on which switch is pressed.

Provided that the special USB socket 44B is connected to the header 40C and not to some other header, the data in the configuration file 58 is specific to the particular model of motherboard 14. Therefore, instead of being included in a file 58 on the HDD 28, the special USB configuration data could alternatively be contained in the BIOS chip 48 or some other non-volatile memory chip on the motherboard 14.

Although the PC 10 has been described as having a single special USB socket 44B, it may be provided with more than one such socket, and different applications may be associated with different sockets.

It should be noted that the embodiment of the invention has been described above purely by way of example and that many other modifications and developments may be made thereto within the scope of the present invention.

The invention claimed is:

1. A computer having a USB bus including at least two connectors to each of which removable USB devices can be connected, the computer being programmed such that, after start-up of the computer and upon connection of a removable USB device to such a connector:

a unique USB address is allocated to that removable USB device, the allocated USB address being used by the computer to address data packets on the USB bus to that removable USB device, and the USB address not necessarily being the same each time that removable USB device is connected to the computer; and at least for some removable USB devices, a software program relevant to that USB device is automatically launched;

characterised in that the computer is programmed to respond differently when a removable USB device is connected to at least one particular one of the USB connectors in that:

the computer is programmed to detect whether that removable USB device has been connected to said one particular USB connector; and in response to such detection, the computer is programmed to do one of the following:

not to launch or to cancel launching of a software program that would have been launched if that removable USB device had been connected said other USB connector;

to launch a software program that would not have been launched if that removable USB device had been connected said other USB connector; and to launch a software program that is different to a software program that would have been launched if that removable USB device had been connected said other USB connector.

2. A computer as claimed in claim 1, wherein:

the computer stores path information indicative of a path to said one particular connector on the USB bus; and the computer is programmed to detect connection of a removable USB device to said one particular connector with reference to the stored path information.

3. A computer as claimed in claim 2, wherein:

the USB bus includes a USB hub having a plurality of ports;

said one particular connector is connected to a particular one of the ports of the USB hub;

the computer is programmed to detect connection of a removable USB device to said one particular connector by:

determining the USB address of the USB hub with reference to the stored path information;

determining the identity of said particular port with reference to the stored path information; and repeatedly requesting the status of the port with the determined identity on the USB hub with the determined USB address.

4. A computer as claimed in claim 1, wherein said one particular USB connector differs in structure from said other USB connector.

5. A computer as claimed in claim 4, in combination with a USB connector adapter having a first portion, similar in structure to said other USB connector, connected to a second portion arranged to connect with said one particular USB connector.

6. A computer as claimed in claim 1, further including a manually operable element associated with said one particular USB connector, wherein the computer is programmed to respond differently when a removable USB device is connected to said one particular USB connector in dependence upon operation of the manually operable element.

7. A method of operation of a computer having a USB bus including at least two connectors to each of which removable USB devices can be connected, the method comprising the steps, after start-up of the computer and upon connection of a removable USB device to such a connector, of:

allocating a unique USB address to that removable USB device, the allocated USB address being usable by the computer to address data packets on the USB bus to that removable USB device, and the USB address not necessarily being the same each time that removable USB device is connected to the computer; and at least for some removable USB devices, automatically launching a software program relevant to that USB device;

characterised by programming the computer to respond differently when a removable USB device is connected to at least one particular one of the USB connectors by:

detecting whether that removable USB device has been connected to said one particular USB connector; and in response to such detection, doing one of the following:

not launching or to cancelling launching of a software program that would have been launched if that removable USB device had been connected said other USB connector;

launching a software program that would not have been launched if that removable USB device had been connected said other USB connector; and launching a software program that is different to a software program that would have been launched if that removable USB device had been connected said other USB connector.

8. A method as claimed in claim 7, further including the steps of:

storing path information indicative of a path to said one particular connector on the USB bus; and detecting connection of a removable USB device to said one particular connector with reference to the stored path information.

9. A method as claimed in claim 8 for operating such a computer in which the USB bus includes a USB hub having a plurality of ports and said one particular connector is connected to a particular one of the ports of the USB hub, the method further including the step of detecting connection of a removable USB device to said one particular connector by:

determining the USB address of the USB hub with reference to the stored path information;

determining the identity of said particular port with reference to the stored path information; and repeatedly requesting the status of the port with the determined identity on the USB hub with the determined USB address.

10. A method as claimed in claim 7 for operating such a computer including a manually operable element associated with said one particular USB connector, the method including the step of responding differently when a removable USB device is connected to said one particular USB connector in dependence upon operation of the manually operable element.

11. The combination of configuration information and a utility program file for a computer having a USB bus including at least two connectors to each of which removable USB devices can be connected, the configuration information being indicative of a path to at least one particular one of the connectors on the USB bus, and the utility program file being arranged, when run on the computer, to cause the computer to respond differently when a removable USB device is connected to said particular one of the USB connectors by:

detecting with reference to the configuration information whether that removable USB device has been connected to said one particular USB connector; and in response to such detection, doing one of the following:

not launching or to cancelling launching of a software program that would have been launched if that removable USB device had been connected said other USB connector;

launching a software program that would not have been launched if that removable USB device had been connected said other USB connector; and launching a software program that is different to a software program that would have been launched if that removable USB device had been connected said other USB connector.

* * * * *